United States Patent
Hernaiz Lopez et al.

(10) Patent No.: US 12,135,111 B2
(45) Date of Patent: Nov. 5, 2024

(54) HYDROGEN TANK FOR AIRCRAFT

(71) Applicant: Airbus Operations S.L.U., Getafe (ES)

(72) Inventors: Guillermo Hernaiz Lopez, Getafe (ES); Jorge Ballestero Méndez, Getafe (ES); Jesus Javier Vazquez Castro, Getafe (ES); Ana Fernandez Ramirez, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 87 days.

(21) Appl. No.: 17/872,702

(22) Filed: Jul. 25, 2022

(65) Prior Publication Data
US 2023/0035247 A1 Feb. 2, 2023

(30) Foreign Application Priority Data
Jul. 27, 2021 (EP) .................................. 21382694

(51) Int. Cl.
*F17C 1/02* (2006.01)

(52) U.S. Cl.
CPC ........ *F17C 1/02* (2013.01); *F17C 2201/0109* (2013.01); *F17C 2203/012* (2013.01); *F17C 2205/0153* (2013.01); *F17C 2221/012* (2013.01); *F17C 2270/0189* (2013.01)

(58) Field of Classification Search
CPC ................ F17C 1/02; F17C 2201/0109; F17C 2203/012; F17C 2209/228
USPC .......... 220/4.12, 4.15, 584, 4.08, 4.09, 4.16; 285/412
See application file for complete search history.

(56) References Cited

U.S. PATENT DOCUMENTS

| | | | | |
|---|---|---|---|---|
| 1,381,877 A | * | 6/1921 | Ickes .................... | B65D 88/528 220/4.17 |
| 1,500,917 A | * | 7/1924 | Bell ........................ | B65D 7/24 47/66.1 |
| 1,651,521 A | * | 12/1927 | Paul ........................ | F17C 1/06 220/651 |
| 1,796,159 A | * | 3/1931 | Pallady ............... | F16L 19/0218 403/336 |
| 2,339,554 A | * | 1/1944 | Kuhn ....................... | F17C 1/08 220/651 |
| 2,344,856 A | * | 3/1944 | Earle ....................... | F17C 1/02 29/446 |

(Continued)

FOREIGN PATENT DOCUMENTS

| | | |
|---|---|---|
| CN | 103090177 A | 5/2013 |
| GB | 2580686 A | 7/2020 |

OTHER PUBLICATIONS

European Search Report; priority document.

*Primary Examiner* — Kevin F Murphy
(74) *Attorney, Agent, or Firm* — Greer, Burns & Crain, Ltd.

(57) ABSTRACT

A hydrogen tank for aircraft, including an inner vessel configured to contain hydrogen, first and second outer jacket domes having a semi-spherical shape and first L-shaped ends, a first semi-cylindrical outer jacket established on top of the first and second outer jacket domes, a second semi-cylindrical outer jacket established in the bottom of the first and second outer jacket domes. The first and second semi-cylindrical outer jackets include second L-shaped ends. The first and second L-shaped ends form L-shaped junctions to attach the first and second outer jacket domes to the first and second semi-cylindrical outer jackets.

11 Claims, 3 Drawing Sheets

(56) References Cited

U.S. PATENT DOCUMENTS

| | | | | |
|---|---|---|---|---|
| 3,252,610 | A | * | 5/1966 | Greenlee ............... F17C 13/123 |
| | | | | 220/651 |
| 3,860,478 | A | | 1/1975 | Bartlow et al. |
| 3,951,362 | A | | 4/1976 | Robinson et al. |
| 4,779,757 | A | * | 10/1988 | Fuckert ..................... F17C 1/10 |
| | | | | 220/4.12 |
| 5,228,585 | A | * | 7/1993 | Lutgen ............. B60K 15/03006 |
| | | | | 220/612 |
| 6,347,719 | B1 | | 2/2002 | Rosen et al. |
| 7,147,124 | B2 | * | 12/2006 | Minta ..................... F17C 1/002 |
| | | | | 220/560.07 |
| 2004/0149760 | A1 | | 8/2004 | Kanno et al. |
| 2007/0068247 | A1 | | 3/2007 | Da Silvia et al. |

\* cited by examiner

HYDROGEN TANK FOR AIRCRAFT

CROSS-REFERENCES TO RELATED APPLICATIONS

This application claims the benefit of the European patent application No. 21382694.4 filed on Jul. 27, 2021, the entire disclosures of which are incorporated herein by way of reference.

FIELD OF THE INVENTION

The present invention relates to a hydrogen tank for aircraft comprising a jacket made of composite materials or metal to fight buckling produced by compression or pressure loads.

BACKGROUND OF THE INVENTION

Current vessels for hydrogen are not designed for aircraft flying conditions and they are divided in two groups, gaseous and liquid hydrogen (GH2 and LH2):

Tanks vessels GH2: They are built to store gas hydrogen and designed with a high thickness to support great pressures (~700 bar) mainly used in industries where vessel weight is not key.

Tanks vessels LH2: They are built to store liquid hydrogen and designed with small thicknesses as they do not support great pressures (~5 bar). They are mainly used in the aero spatial sector where weight is key for the launch vehicle.

In applications for aircraft, the LH2 tank solution is the most suitable due to the weight condition, but in addition to the many challenges that LH2 tanks solve for launch vehicles, additional requirements must be solved to integrate LH2 tanks in aircraft systems. In particular:

Flight maneuvers: An aircraft has a larger range of maneuvers than a launch vehicle which mainly has accelerations in the Z axis which could be reacted by the vehicle rings. For aircraft applications, an additional protection to the LH2 vessel is required to attach the tank to the aircraft and withstand flight loads.

Insulation: Due to different mission conditions, the dormancy time for an aircraft application compared to a launch vehicle is longer. This implies that the tank insulation requires additional complexity including vacuum in between the additional protection and the inner vessel, in contrast to the space application wherein vacuum is not required.

Pressure load: The use of flat panels as integrated elements of tank vessels is subjected to pressure loads, which induce compression loads in the panel, presenting one of the worst cases for buckling conditions. Hence, additional reinforcement for flat panels is desired.

SUMMARY OF THE INVENTION

The present application solves the mentioned challenges in tank vessels for aircraft.

The present application proposes a new kind of tank composed of a vessel to withstand positive pressure loads (tension) and an outer jacket made of composite materials or metal that provides a lighter solution that withstands vacuum pressure and flight loads. The outer jacket comprises a cylindrical area and two semi-spheres.

In particular, the tank comprises first and second outer jacket domes having a semi-spherical shape and first L-shaped ends. The first and second semi-cylindrical outer jackets comprise second L-shaped. The first and second L-shaped ends form L-shaped junctions that attach the first and second outer jacket domes to the first and second semi-cylindrical outer jackets.

The first and second outer jacket domes and the first and second semi-cylindrical outer jackets are made of composite materials or metal.

The main advantages of the present invention are:

The proposed hydrogen tank improves mechanical properties compared to conventional designs for curved panels and its integration. The proposed outer jacket junction presents a modular composition of the outer jacket which facilitates correct access for the installation of the systems and the assembly of the insulation layers and vacuum creation. The proposed modular concept allows a proper disassembly process of the outer jacket for tank structure or systems inspection and repair.

The proposed tank solution contributes to simplify composite material LH2 tank designs for aircraft application due to the need of stiffeners and panel thickness reduction, presenting the following advantages compared to a metallic tank design:

Weight saving: A composite material solution allows a lighter solution compared to a metallic concept which redounds in a lighter tank for equivalent LH2 quantity.

Improve buy to fly compared to metallic solutions.

In a preferred embodiment, the first and second semi-cylindrical outer jackets comprise reinforcing elements.

In a first example of the preferred embodiment, the reinforcing elements are established in the outer side of the first and second semi-cylindrical outer jackets.

In a second example of the preferred embodiment, the reinforcing elements are established in the inner side of the first and second semi-cylindrical outer jackets.

In some examples, the reinforcing elements comprise bulges with round form or bulges with omega form comprising the same material as the first and second semi-cylindrical outer jackets.

In other examples, the reinforcing elements comprise stingers, pads or doublers comprising the same material as the first and second semi-cylindrical outer jackets.

In a third example, the first and second semi-cylindrical outer jackets comprise radial channels.

In the preferred example, the L-shaped junctions comprise fasteners. In some examples, the fasteners are established in a staggered pattern.

BRIEF DESCRIPTION OF THE DRAWINGS

For a better understanding the above explanation and for the sole purpose of providing an example, some non-limiting drawings are included that schematically depict a practical embodiment.

DETAILED DESCRIPTION OF THE PREFERRED EMBODIMENTS

Figure 1:
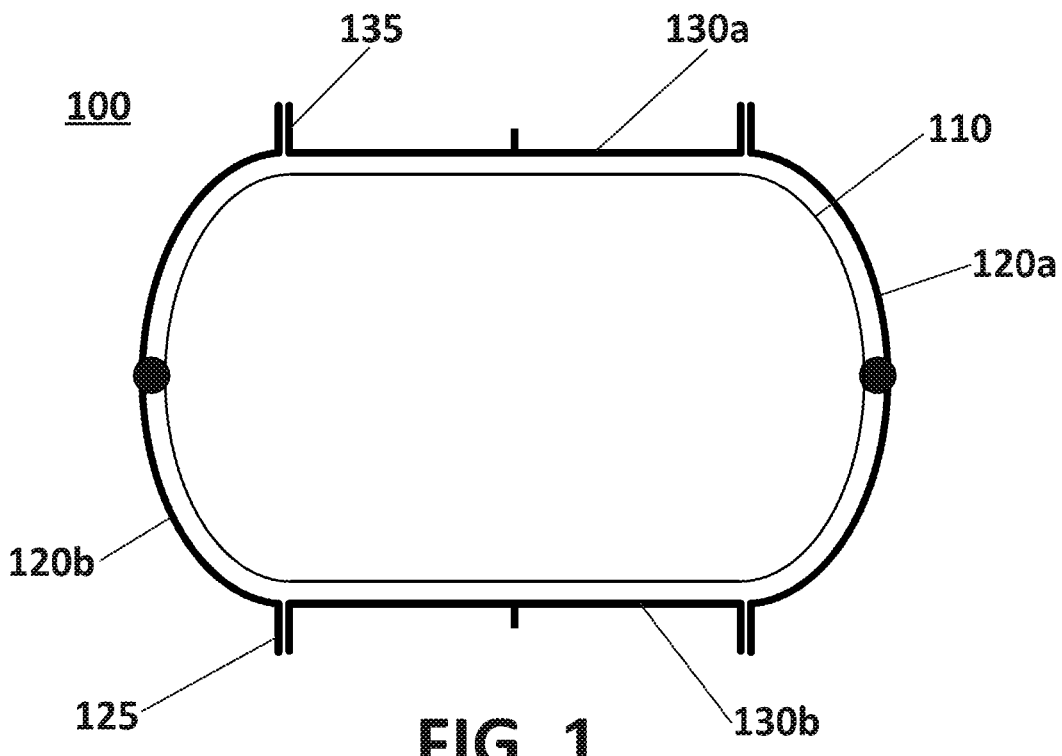
FIG. 1 shows a schematic representation of a tank vessel according to the present invention.

FIG. 1 shows a schematic representation of a hydrogen tank (100) according to the present invention.

The hydrogen tank (100) shown in FIG. 1 comprises an inner vessel (110) configured to contain hydrogen.

The proposal, which is mainly based in the outer tank, is to have a jacket divided in two main parts:

The first part comprises first and second outer jacket domes (120a, 120b) having a semi spherical shape and first L-shaped ends (125).

The second part comprises a first semi-cylindrical outer jacket (130a) established on top of the first and second outer jacket domes (120a, 120b), and a second semi-cylindrical outer jacket (130b) established in the bottom of the first and second outer jacket domes (120a, 120b).

The first and second semi-cylindrical outer jackets (130a, 130b) combine to form a cylindrical outer jacket and comprise second L-shaped ends (135). The first and second L-shaped ends (125, 135) form L-shaped junctions (400) that attach the first and second outer jacket domes (120a, 120b) to the first and second semi-cylindrical outer jackets (130a, 130b).

The first and second outer jacket domes (120a, 120b) and the first and second semi-cylindrical outer jackets (130a, 130b) can be made of composite materials or metal.

Figure 2:
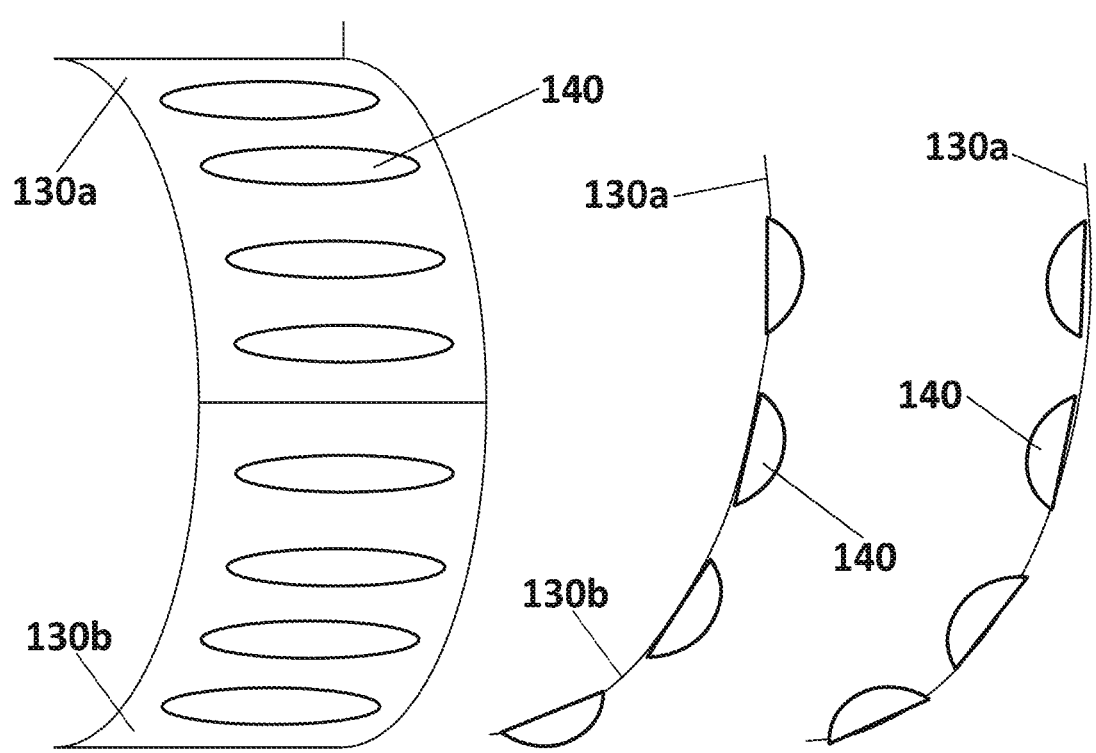
FIG. 2 shows the reinforcement elements for the cylindrical outer jacket, and frontal and lateral views of possible reinforcement elements orientation.

The semi-cylindrical outer jackets (130a, 130b) which has a simple curvature have the worst behavior under buckling conditions. To solve this drawback, the following solutions are proposed:

To avoid the addition of reinforcements to the structure or the increase of thickness to avoid buckling, which may redound in a weight increase, a new solution for the semi-cylindrical outer jackets (130a, 130b) is based on the following configuration as depicted in FIG. 2 that shows a front view and lateral views of the first semi-cylindrical outer jacket (130a) comprising reinforcing elements (140).

For this particular example, the reinforcing elements (140) comprise bulges that can have a round form as shown in FIG. 2. In another example, the bulges can have an omega form. The shape of the bulges may depend on the best response in terms of structural and/or manufacturing behavior. Either the round form or the omega form can be chosen considering applied loads and pressure, as well as the distribution of the bulges, either pointing to the inner side of the first semi-cylindrical outer jacket (130a) or to outer side, as shown in the lateral views shown in FIG. 2. The bulges can comprise the same material as the first and second semi-cylindrical outer jackets.

Figure 3:
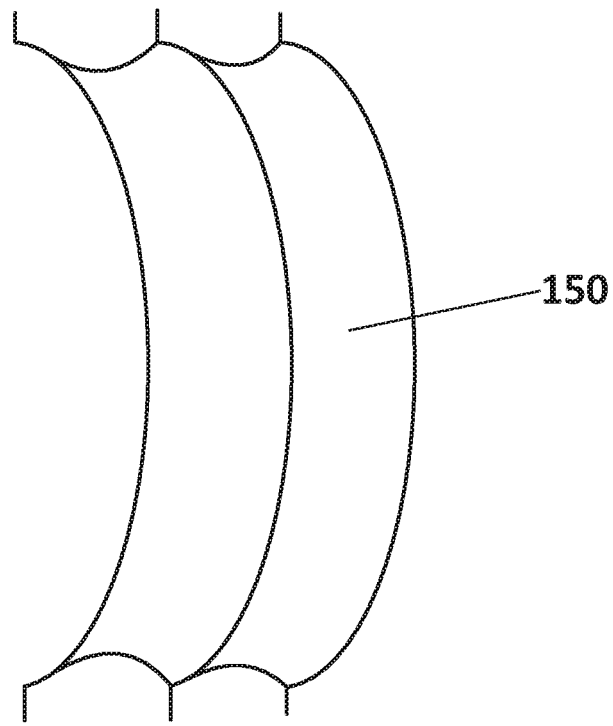
FIG. 3 shows the cylindrical part of the tank divided in radial channels.

FIG. 3 shows another solution to fight buckling. In particular, the first semi-cylindrical outer jacket (130a) comprises division in channels (150) in the radial direction. This implementation of the reinforcing elements (140) has the advantage that the action pressure is transformed into tension loads in the panel which has the potential of alleviating the buckling behavior.

Figure 4:
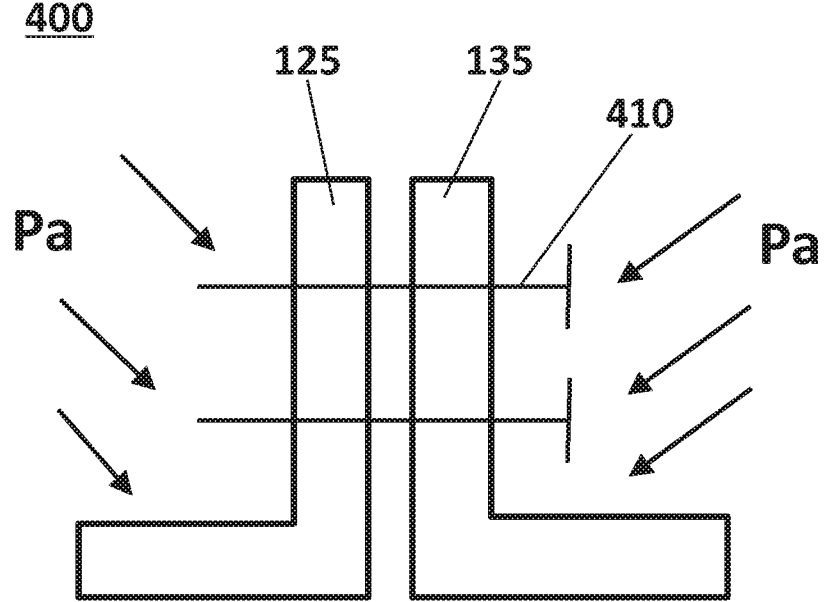
FIG. 4 shows the L-shaped junction according to the present invention.
Figure 5:
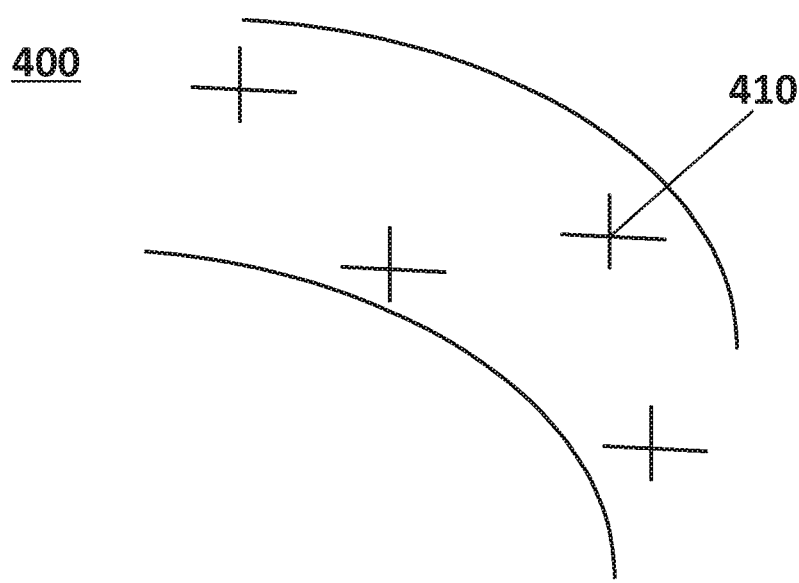
FIG. 5 shows a detail of the L-shaped junction.

FIG. 4 shows the junction (400) formed by the L-shaped ends (125, 135) of the first and second outer jacket domes (120a, 120b) and the semi-cylindrical outer jackets (130a, 130b). The L-shaped ends (125, 135) can be joined by fasteners (410) distributed in a staggered pattern as shown in FIG. 5.

This junction (400) can avoid drilling the vacuum area for fasteners installation and have the same pressure acting at the external area of both "Ls" avoiding risks of area collapse and vacuum lost, as shown in FIG. 4. Additionally, in terms of structural behavior, the L-shape junction having two parts loaded mainly in compression avoids unfolding effects in the junction. The staggered pattern is presumed to be better than the simple pattern to ensure the vacuum in the insulation area between the inner vessel and outer tank.

Even though reference has been made to a specific embodiment of the invention, it is obvious for a person skilled in the art that the hydrogen tanks described herein are susceptible to numerous variations and modifications, and that all of the details mentioned can be substituted for other technically equivalent ones without departing from the scope of protection defined by the attached claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A hydrogen tank for aircraft, comprising:
an inner vessel configured to contain hydrogen;
first and second outer jacket domes having a semi-spherical shape and first L-shaped ends;
a first semi-cylindrical outer jacket established on top of the first and second outer jacket domes, and
a second semi-cylindrical outer jacket established in the bottom of the first and second outer jacket domes which directly contacts the first semi-cylindrical outer jacket;
wherein the first and second semi-cylindrical outer jackets combine to form a cylindrical outer jacket and comprise second L-shaped ends;
wherein the first and second L-shaped ends form L-shaped junctions to attach the first and second outer jacket domes to the first and second semi-cylindrical outer jackets; and
wherein the cylindrical outer jacket is configured to be selectively disassembled.

2. The hydrogen tank according to claim 1, wherein the first and second semi-cylindrical outer jackets comprise reinforcing elements.

3. The hydrogen tank according to claim 2, wherein the reinforcing elements are established in the outer side of the first and second semi-cylindrical outer jackets.

4. The hydrogen tank according to claim 2, wherein the reinforcing elements are established in the inner side of the first and second semi-cylindrical outer jackets.

5. The hydrogen tank according to claim 2, wherein the reinforcing elements comprise bulges with a round form.

6. The hydrogen tank according to claim 2, wherein the reinforcing elements comprise the same material as the first and second semi-cylindrical outer jackets.

7. The hydrogen tank according to claim 1, wherein the first and second semi-cylindrical outer jackets comprise radial channels.

8. The hydrogen tank according to claim 1, wherein the L-shaped junctions comprise fasteners.

9. The hydrogen tank according to claim 8, wherein the fasteners comprise a staggered pattern.

10. The hydrogen tank according to claim 1, wherein the first and second outer jacket domes, and the first and second semi-cylindrical outer jackets, are made of composite materials.

11. The hydrogen tank according to claim 1, wherein the first and second outer jacket domes, and the first and second semi-cylindrical outer jackets, are made of metal.

\* \* \* \* \*